United States Patent
Yenilmez et al.

(10) Patent No.: US 7,022,541 B1
(45) Date of Patent: Apr. 4, 2006

(54) PATTERNED GROWTH OF SINGLE-WALLED CARBON NANOTUBES FROM ELEVATED WAFER STRUCTURES

(75) Inventors: Erhan Yenilmez, Mountain View, CA (US); Hongjie Dai, Sunnyvale, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 11 days.

(21) Appl. No.: 10/299,978

(22) Filed: Nov. 18, 2002

Related U.S. Application Data

(63) Continuation-in-part of application No. 10/285,311, filed on Oct. 31, 2002.

(60) Provisional application No. 60/332,688, filed on Nov. 19, 2001.

(51) Int. Cl.
*H01L 21/00* (2006.01)

(52) U.S. Cl. .................. 438/52; 438/466; 438/780; 438/782; 438/951

(58) Field of Classification Search .............. 438/1, 438/466, 780, 782, 951
See application file for complete search history.

(56) References Cited

U.S. PATENT DOCUMENTS

| | | | |
|---|---|---|---|
| 4,495,793 A | 1/1985 | Hager | |
| 5,334,351 A | 8/1994 | Heinze | |
| 5,436,167 A | 7/1995 | Robillard | |
| 5,448,906 A | 9/1995 | Cheung | |
| 5,482,601 A | 1/1996 | Ohshima et al. | |
| 5,500,200 A | 3/1996 | Mandeville et al. | |
| 5,547,748 A | 8/1996 | Ruoff et al. | |
| 5,571,395 A | 11/1996 | Park et al. | |
| 5,626,650 A | 5/1997 | Rodriguez et al. | |
| 5,643,670 A | 7/1997 | Chung | |
| 5,650,370 A | 7/1997 | Tennant et al. | |
| 5,653,951 A | 8/1997 | Rodriguez et al. | |
| 5,690,997 A | 11/1997 | Grow | |
| 5,707,916 A | 1/1998 | Snyder et al. | |
| 5,726,116 A | 3/1998 | Moy et al. | |
| 5,726,524 A | 3/1998 | Debe | |
| 5,780,101 A | 7/1998 | Nolan et al. | |
| 5,830,326 A | 11/1998 | Iijima et al. | |
| 5,866,434 A | 2/1999 | Massey et al. | |
| 5,872,422 A | 2/1999 | Xu | |
| 5,891,395 A | 4/1999 | Glaunsinger et al. | |

(Continued)

FOREIGN PATENT DOCUMENTS

| | | |
|---|---|---|
| WO | 9510481 | 4/1995 |

(Continued)

OTHER PUBLICATIONS

Chen, R.J. "Molecular photodesorption from single-walled carbon nanotubes" Applied Physics Letters, Oct. 2001, vol. 79, No. 14, pp. 2258-2260.

(Continued)

*Primary Examiner*—Richard A. Booth
(74) *Attorney, Agent, or Firm*—Crawford Maunu PLLC

(57) ABSTRACT

A wafer-scale fabrication approach for manufacturing single-walled carbon nanotube (SWNT) tips is implemented. Catalyst material is selectively placed (e.g., patterned) onto a plurality of prefabricated elevated structures (e.g., silicon tips) on a wafer. SWNTs are grown protruding from the catalyst on the elevated structures. The resulting SWNT protruding from a tip can be implemented in a variety of applications, such as in atomic force microscopy (AFM). With this approach, nanotube tips can be implemented for a variety of applications, including advanced nanoscale imaging, imaging of solid-state and soft biological systems and for scanning probe lithography.

24 Claims, 4 Drawing Sheets

U.S. PATENT DOCUMENTS

| | | | |
|---|---|---|---|
| 6,012,327 A | 1/2000 | Seth et al. | |
| 6,105,417 A | 8/2000 | Nosaka et al. | |
| 6,159,742 A | 12/2000 | Lieber et al. | |
| 6,162,926 A | 12/2000 | Murphy et al. | |
| 6,346,189 B1 | 2/2002 | Dai et al. | |
| 6,528,020 B1 * | 3/2003 | Dai et al. | 422/98 |

FOREIGN PATENT DOCUMENTS

| | | |
|---|---|---|
| WO | 9805920 | 2/1998 |

OTHER PUBLICATIONS

Koshio, A. et al, "In situ laser-furnace TOF mass spectrometry of C36 and the large-scale production by arc-discharge" J. Phys. Chem. B, Jul. 2000, vol. 104, pp. 7908-7913, especially pp. 7908-7909.

Jan. 28, 2000, Jing Kong, Nathan R. Franklin, Chongwu Zhou, Michael G. Chapline, Shu Peng, Kyeongjae Cho, and Hongjie Dai, *Nanotube Molecular Wires as Chemical Sensors*, Science vol. 287, pp. 622-625, www.sciencemag.org.

Aug. 26, 2001, Hongjie Dai, *Integrated Nanotube-Electronic Noses and Bio-Chips (DNA-Chips & Protein Chips)*, pp. 1-7.

Dai, H., "Nanotubes as nanoprobes in scanning probe microscopy," Nature, vol. 384, Nov. 14, 1996, pp. 147-149.

Dagani, "Much Ado About Nanotubes", C&E News, Jan. 11, 1999, pp. 31-34.

* cited by examiner

US 7,022,541 B1

PATTERNED GROWTH OF SINGLE-WALLED CARBON NANOTUBES FROM ELEVATED WAFER STRUCTURES

RELATED PATENT DOCUMENTS

This is a continuation of U.S. Provisional Patent Application Ser. No. 60/332,688 (STFD.025P1/S01-244P1) filed on Nov. 19, 2001 and entitled "Wafer Scale Production of Carbon Nanotube Scanning Probe Tips for Atomic Force Microscopy," to which priority is claimed under 35 U.S.C. §120 for common subject matter. This is also a continuation-in-part of U.S. patent application Ser. No. 10/285,311 (STFD.024PA/S01-244) filed on Oct. 31, 2002 and entitled "Patterned Growth of Carbon Nanotubes on Wafers," which is fully incorporated herein by reference.

FEDERALLY SPONSORED RESEARCH OR DEVELOPMENT

This invention was made with Government support under contract MDA 972-01-1-0021 awarded by the Defense Advanced Research Projects Agency. The U.S. Government has certain rights in this invention.

FIELD OF THE INVENTION

The present invention relates generally to nanotubes and more particularly to the growth of carbon nanotubes on elevated structures.

BACKGROUND

Carbon and carbon-containing nanotubes are unique carbon-based, molecular structures that exhibit interesting and useful electrical properties. There are two general types of carbon nanotubes, referred to as multi-walled carbon nanotubes (MWNTs) and single-walled carbon nanotubes (SWNTs). SWNTs have a cylindrical sheet-like, one-atom-thick shell of hexagonally-arranged carbon atoms, and MWNTs are typically composed of multiple coaxial cylinders of ever-increasing diameter about a common axis. Thus, SWNTs can be considered to be the structure underlying MWNTs and also carbon nanotube ropes, which are uniquely-arranged arrays of SWNTs.

SWNTs are ideal quantum systems for exploring basic science in one-dimension. Molecular-scale SWNTs, derived by bottom-up chemical synthesis approaches, are also promising as core components or interconnecting conductors for electronics, tips for atomic force microscopy (AFM) and other applications. When isolated, individual nanotubes are particularly useful for making microscopic electrical, mechanical, and electromechanical devices.

Obtaining individual, high quality, single-walled nanotubes has proven to be a difficult task. Existing methods for the production of nanotubes, including arc-discharge and laser ablation techniques, yield bulk materials with tangled nanotubes that tend to be mostly in bundled forms. These tangled nanotubes are extremely difficult to purify, isolate, manipulate, and use as discrete elements for making functional devices. AFM probe tips, for example, are sized and shaped in a manner that affects the lateral resolution and fidelity of AFM images.

The above-mentioned and other difficulties in mass-producing carbon nanotubes have presented challenges to the implementation of such nanotubes in a variety of applications.

SUMMARY

The present invention is directed to the fabrication of carbon nanotube tips that may be implemented, for example, in atomic force microscopy (AFM) probe tip applications. The present invention is exemplified in a number of implementations and applications, some of which are summarized below.

According to an example embodiment of the present invention, carbon nanotubes are grown extending from an elevated structure on a substrate. The elevated structure is made having one or more of a variety of substances and/or shapes. In one instance, silicon and/or other semiconducting materials having a pyramidal shape is used. The carbon nanotubes are grown using one or more of a variety of approaches, such as those involving catalyst coatings near and/or on the elevated structure. In one implementation, catalyst material is formed on at least a portion of the elevated structure, and in another implementation, catalyst material is formed around a base portion of the elevated structure. A carbon-containing gas is introduced to the catalyst material for chemical vapor deposition (CVD) growth of carbon nanotubes. With this approach, carbon nanotubes are formed from select locations, addressing challenges including those discussed above.

According to another example embodiment of the present invention, catalyst material is formed on a plurality of tips extending from a wafer. In one implementation, photoresist material is formed on the wafer, such that the tips are not covered with the photoresist material. Catalyst is then formed on the wafer, for example, by spin-coating a catalyst suspension over the entire wafer. The photoresist is then removed, which also removes the catalyst material on the photoresist. Catalyst material is left behind on the tips, from which carbon nanotubes are subsequently grown.

In still another example embodiment of the present invention, a carbon nanotube is shortened using an electrical discharge approach. An electric bias voltage is applied between a carbon nanotube and a substrate. The bias voltage shortens the carbon nanotube, which can then be implemented in applications, such as AFM, benefiting from rigid, non-sticking nanotubes.

In one implementation, a nanotube being shortened as discussed above extends from a cantilever tip and the tip is oscillated to contact a surface, such as in a tap mode contact with a substrate. A force curve is obtained for the contact with the surface and is monitored to detect the amplitude of the oscillation. A reduction in the amplitude on the force curve is interpreted as the shortening of the nanotube, such that a threshold amplitude level can be used to detect that the nanotube has been shortened to a relatively rigid tube suitable for implementation, for example, in AFM.

The above summary invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which:

FIGS. 2A–2D show a catalyst suspension being spin coated onto a cantilever on a wafer, according to another example embodiment and wherein:

FIG. 2A is a cantilever on a wafer;

FIG. 2B shows a photoresist spin coat being applied to the wafer of FIG. 2A;

FIG. 2C shows catalyst material patterned onto the wafer of FIG. 2B; and

FIG. 2D shows a portion of the catalyst material of FIG. 2C being removed;

Figure 1:
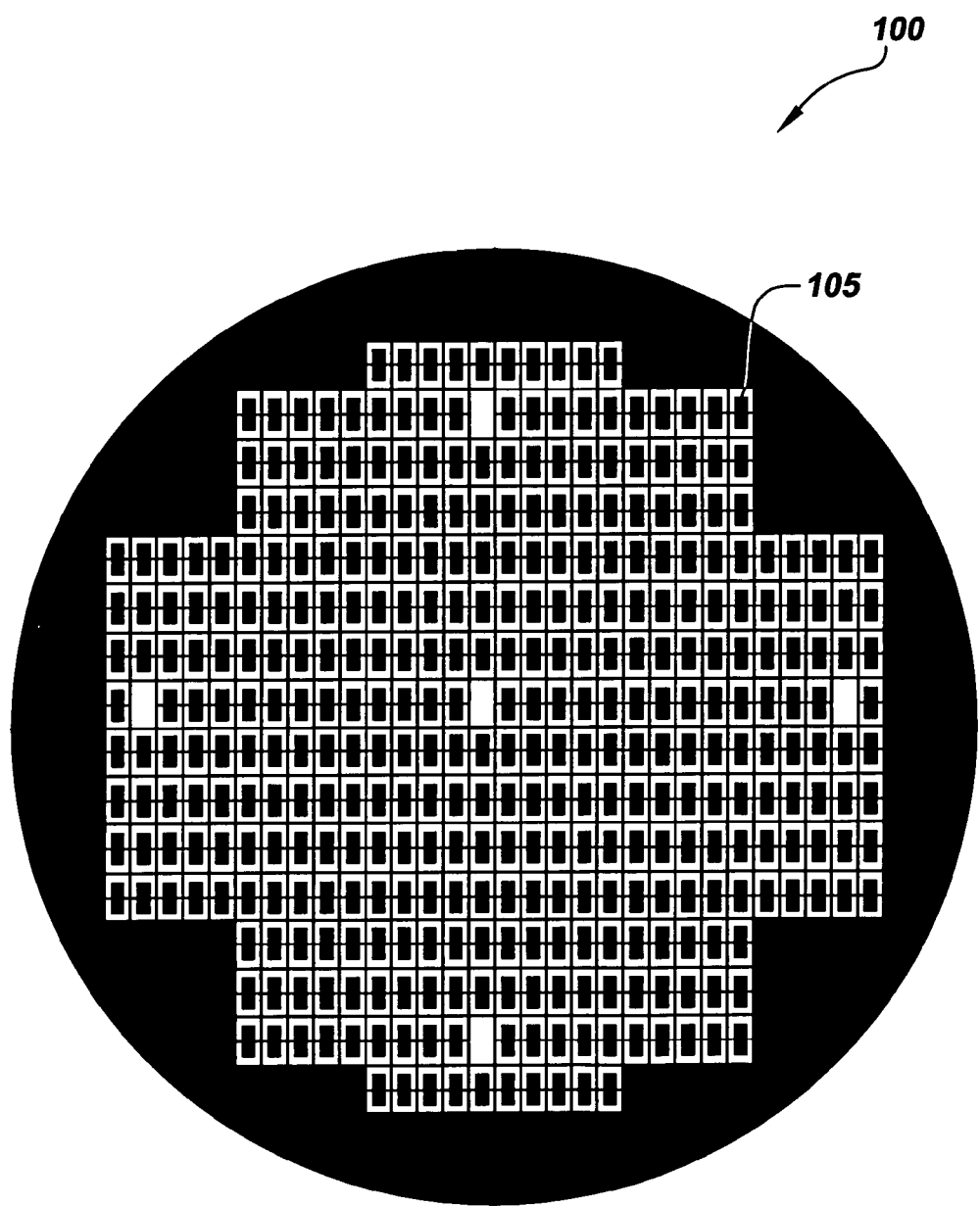
FIG. 1 is a wafer having silicon cantilevers, for use in connection with an example embodiment of the present invention.
Figure 2A:
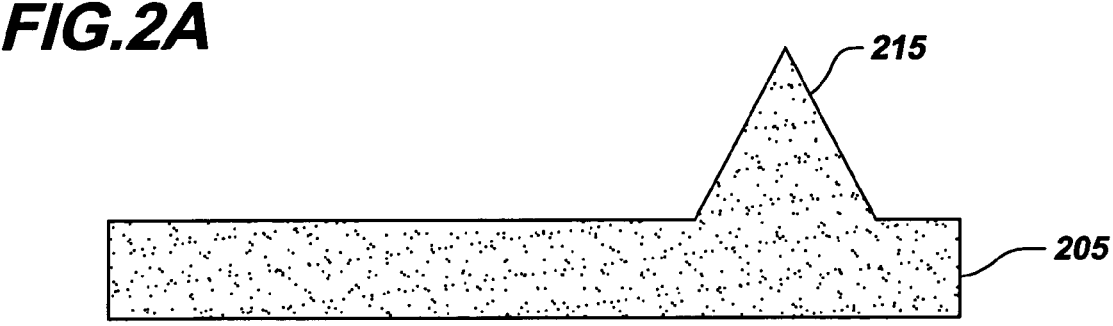
Figure 2B:
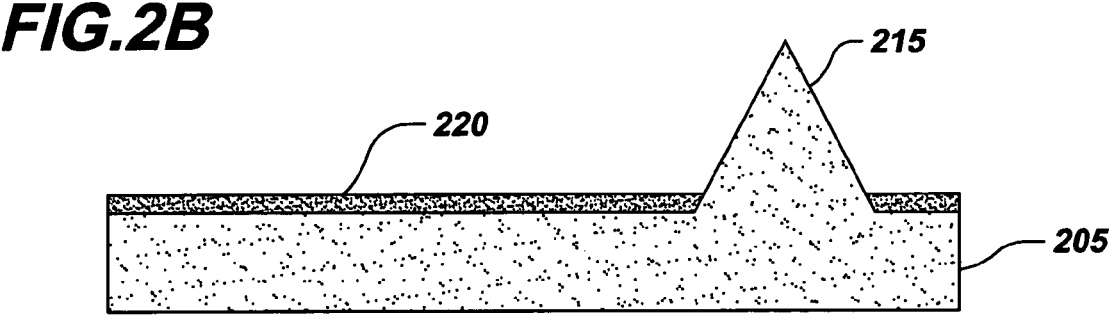
Figure 2C:
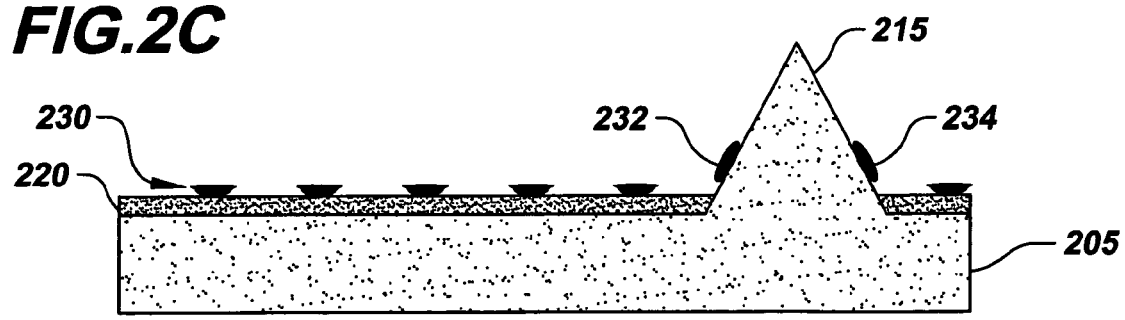
Figure 2D:
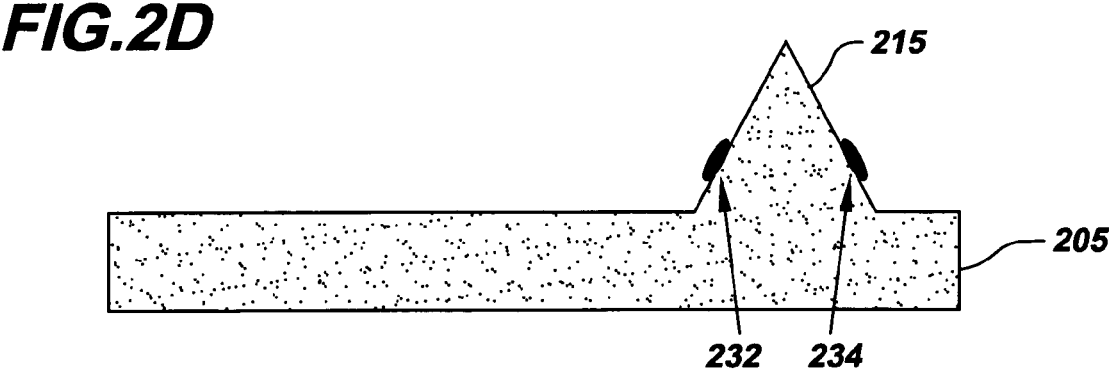

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to a variety of different types of devices and implementations, and the invention has been found to be particularly suited for approaches involving carbon nanotubes on tips extending from a wafer, as well as the manufacture thereof. While the present invention is not necessarily limited to such approaches, various aspects of the invention may be appreciated through a discussion of various examples using this context.

According to an example embodiment of the present invention, carbon nanotubes (e.g., SWNTs) extend from tips on a wafer. The tips may include, for example, typical material formed in connection with a semiconductor wafer, such as silicon, having catalyst material for carbon nanotube growth thereon. With this approach, the resulting structures can be produced in large quantities and implemented with probing applications, such as atomic force microscopy (AFM).

In one implementation, catalyst material is patterned on the tips and over the wafer using a process such as deep ultra-violet (DUV) photolithography and spin casting, wherein catalyst material is grown over the entire wafer. A portion of the catalyst material is formed on a sidewall region of each of the tips, and carbon nanotubes are grown extending from the tips using the catalyst to catalyze methane to form carbon in a CVD process.

The present invention can be implemented in a variety of manners, and is particularly suited for large-scale implementations, wherein a plurality of nanotubes are formed extending from tips. In one particular implementation, a catalyst is patterned on full wafers (e.g., about 4" diameter), each wafer having several hundred tips. The catalyst is patterned using photoresist spin-coating, catalyst deposition (e.g., deposition of a catalyst suspension via spin-coating) and liftoff of selected portions of the catalyst, leaving catalyst material on a sidewall portion of each of the silicon tips.

The wafers are then placed in a CVD furnace capable of high temperatures (e.g., over 800° C.) and having a gas inlet and exhaust. The gas inlet is adapted for introducing a carbon-containing gas, such as methane, along with hydrogen as a co-flow gas. The carbon-containing gas is used as carbon feedstock for CVD of carbon onto the silicon tips for nanotube growth, and the amount of hydrogen co-flow is selected to maintain the CVD growth of the nanotubes while inhibiting unwanted side effects (e.g., pyrolysis, amorphous carbon formation, etc.). In connection herewith, it has been discovered that approaches of this type permit growth of SWNTs extending from most (e.g., more than 90%) of the silicon tips on the wafer, which is particularly advantageous for the mass-production of nanotube probe tips, as further discussed in connection with FIG. 3 below.

FIG. 1 shows a wafer 100 having a plurality of silicon tips 105 (elevated structures) extending therefrom and adapted for growing carbon nanotube probe tips, according to another example embodiment of the present invention. The wafer 100 may be, for example, a commercially available wafer, such as those made by Nanodevices of Santa Barbara, Calif. In this instance, the wafer is shown having silicon tips in about a 16×30 array. In another particular instance, the wafer includes several hundred prefabricated silicon cantilevers with integrated pyramidal tips. Catalyst material is patterned on the pyramidal tips, such as described above, and used for the subsequent growth of carbon nanotubes extending from the pyramidal tips.

FIGS. 2A–2D show an individual cantilever 205 having a silicon tip 215 undergoing catalyst patterning for subsequent CVD growth of a carbon nanotube therefrom, according to another example embodiment of the present invention. The cantilever is part of a wafer having a plurality of cantilevers, such as the wafer shown in FIG. 1. The wafer is mounted on a support structure, such as on top of a plain silicon wafer, and the assembly is used for processing including CVD growth of carbon nanotubes. Polymethylmethacrylate (PMMA) 220 is spun onto the wafer at a spin speed of about 1000 rpm in FIG. 2B using a spin-coating arrangement. The PMMA is dissolved in a solvent, such as dichlorobenzene, with a resulting concentration of about 9% PMMA. The spun PMMA forms a film 220 that is approximately 1 mm thick and covers some of, or the entire, wafer including most of the cantilever 205. The silicon tip 215 on the cantilever protrudes from the PMMA layer and, using the non-conformal nature of spin coated resist and/or other processing, at least a portion of the silicon tip on the cantilever is left exposed and substantially free from the PMMA coating.

Subsequently, a liquid catalyst suspension 230 is spin coated onto the wafer at a low spin speed (e.g., about 250 rpm). The catalyst suspension is adapted to promote the growth of carbon nanotubes and, in one implementation, includes 15 mg of alumina nanoparticles, 20 mg of $Fe(NO_3)_3 \cdot 9H_2O$ and 2 mg of $MoO_2(acac)_2$ in 15 mL of methanol, where the alumina supports the catalyst in a suspension. The PMMA and/or the catalyst spin-coating arrangements may, for instance, include one or more commercially-available spin-coating arrangements, such as those available from Laurell Technologies Corporation of North Wales, Pa., USA. The PMMA layer is lifted off in a solvent, such as acetone or 1,2 dichloroethane, which leaves portions 232 and 234 of the catalyst 230 around the pyramidal surfaces of the silicon tip 215. Single-walled carbon nanotubes are then grown from the silicon tip using the catalyst portions 232 and 234 to catalyze the growth. An example of such growth is illustrated and described in U.S. Pat. No. 6,346,189 (Dai et al.).

In another example embodiment of the present invention, a sub-nanometer thick metal (e.g., iron) film is evaporated onto the silicon tips protruding from a PMMA film, similar to film 220. The PMMA is then lifted off, leaving catalyst particles (e.g., iron) around the silicon tips, with the PMMA inhibiting the formation of the catalyst particles on parts of the wafer other than the silicon tips, thus restricting nanotube growth to the silicon tips. The yield of SWNTs with this approach is similar to yields achieved using spin-coated catalyst, such as the alumina supported catalyst discussed above.

In still another example embodiment of the present invention, catalyst is patterned on a cantilever tip during the manufacture thereof. In this implementation, wafers of cantilevers having silicon pyramid tips are fabricated having a catalyst on sidewalls of the silicon pyramid tips. In this manner, resist patterning and subsequent catalyst formation as discussed above is not necessarily required, and the nanotube tips are grown directly from the manufactured wafers.

Figure 3:
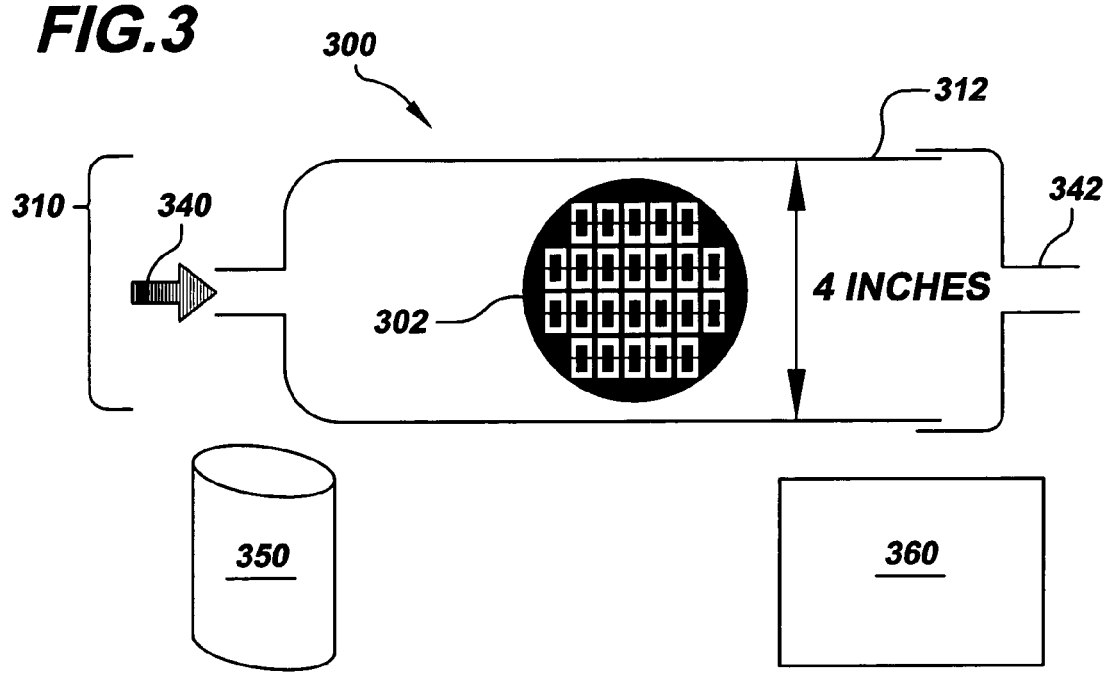
FIG. 3 is a system for chemical vapor deposition (CVD) growth of carbon nanotubes, according to another example embodiment of the present invention.

The nanotubes can be grown from the silicon tips as discussed above and in other implementations using one or more of a variety of approaches. In this regard, FIG. 3 shows a system 300 adapted to grow carbon nanotube probe tips, according to another example embodiment of the present invention. The system 300 includes a spin-coating arrangement 350 adapted for spin-coating materials onto a wafer 302 (constructed similar to wafer 100 in FIG. 1) having cantilevers with silicon tips, such as the cantilever 205 shown in FIG. 2D. Photoresist and/or catalyst coatings are coated onto the wafer 302 with the spin-coating arrangement 350. A lift-off arrangement 360 includes a solvent tank adapted for dissolving the photoresist after catalyst spin coating. A CVD chamber 310 is adapted to hold a wafer 302 for carbon nanotube growth. The CVD chamber 310 includes gas inlet 340 and exhaust gas outlet 342 for respectively supplying gas to and exhausting gas from the wafer 302, and also includes a furnace 312 adapted to heat the wafer 302 for CVD processing.

In one particular implementation, the system 300 is used to grow single-walled carbon nanotubes on silicon pyramid tips on the wafer 302 using methane as carbon feedstock for the CVD growth. The wafer 302 is heated up to about 900° C. in an argon gas flow after a thorough purge of the furnace 312 with argon. Ultra-high purity methane (e.g., about 99.999% purity) at a flow rate of about 1500 sccm (standard cubic centimeters per minute) is introduced to the wafer 302 via inlet 340 with a co-flow of hydrogen at a flow rate of about 125 sccm for a growth time of about 7 minutes. Hydrogen is then flowed through the furnace 312 as it is cooled to about room temperature. This CVD approach has been discovered to result in high yield growth of SWNTs from catalyst particles placed around the silicon pyramid tips (e.g., particles 232 and 234 in FIG. 2D), with individual SWNTs and/or small bundles of tubes extending from each silicon pyramid tip. The nanotubes hare held in place by van der Waals (vdW) forces between the nanotubes and the silicon pyramids, and a length of the nanotube overlaying on the pyramid maintains and supports the orientations of the nanotubes as desired for implementation of the cantilevers as probe tips (e.g., AFM tips).

In a more particular example embodiment of the present invention, the co-flow of hydrogen discussed above is implemented to achieve nanotube growth while inhibiting pyrolysis. More specifically, the flows of high purity methane and hydrogen are systematically balanced to result in an active growth regime in which carbon feedstock is sufficiently supplied to catalyst material (e.g., particles and/or a layer on a base of a tip) for nanotube growth, yet without excessive hydrocarbon pyrolysis. In connection with this example embodiment, it has been discovered that lowering or raising the hydrogen flow could respectively result in pyrolysis and inactive regimes. In the pyrolysis regime, catalyst poisoning occurs due to hydrocarbon self-decomposition. In the inactive regime, carbon feedstock is insufficient due to hydrogen suppression of hydrocarbon reactivity. Using this approach, hydrogen co-flow rates are identified for achieving active nanotube growth regimes in CVD systems. In addition, this approach can also be used with various chamber sizes (e.g., diameters), wherein the hydrogen co-flow is identified for a particular chamber size. This approach is useful for scaling-up SWNT synthesis on large substrates. For more information regarding the use of hydrogen co-flow in CVD growth of carbon nanotubes, reference may be made to the above-referenced U.S. patent application entitled "Patterned Growth of Carbon Nanotubes on Wafers" (Dai, et al.).

Figure 4A:
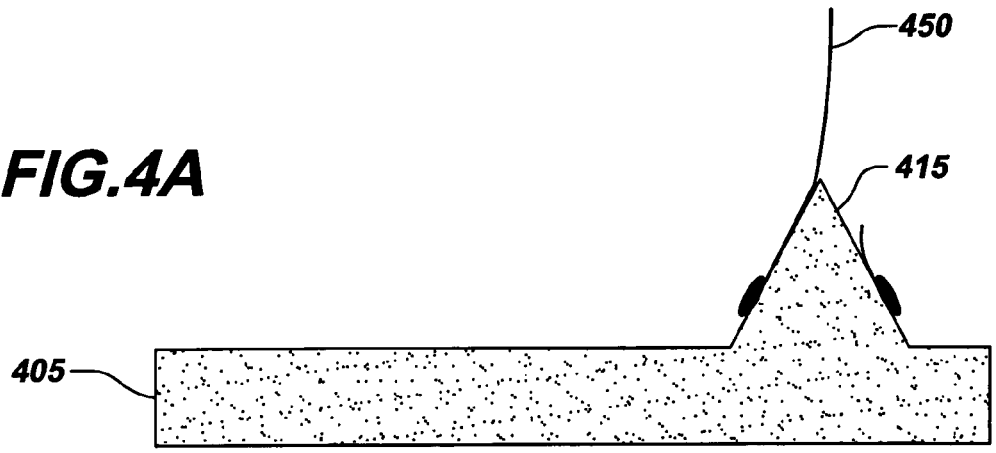
FIG. 4A is a nanotube grown off of a cantilever tip, according to another example embodiment of the present invention.
Figure 4B:
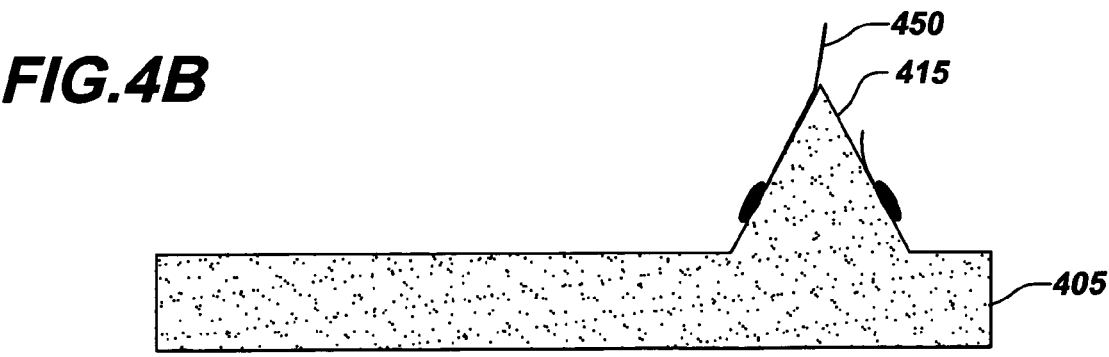
FIG. 4B is the nanotube shown in FIG. 4A having been shortened for use in AFM, according to another example embodiment of the present invention.

FIGS. 4A and 4B show a SWNT 450 grown from a silicon pyramid 415 on a cantilever 405 and undergoing shortening, according to another example embodiment of the present invention. The cantilever 405 may be, for example, formed in a manner as discussed in connection with the cantilever shown in FIG. 2D and/or the other example embodiments and implementations discussed above. Referring to FIG. 4A, the SWNT 450 is shown extending about 1–10 mm in length from the tip 415. The cantilever 405 is removed from a wafer (e.g., see FIG. 1 and/or FIG. 3) and mounted on an AFM arrangement, such as one available from Digital Instruments of Santa Barbara, Calif. The SWNT 450 is electrically discharged in ambient atmosphere against a conducting substrate during tapping mode force measurement. This technique shortens the SWNT 450 so that it extends about 30–100 nm from the silicon tip 415, as shown in FIG. 4B, thereby resulting in a mechanically rigid nanotube probe tip useful in AFM implementations.

Figure 5A:
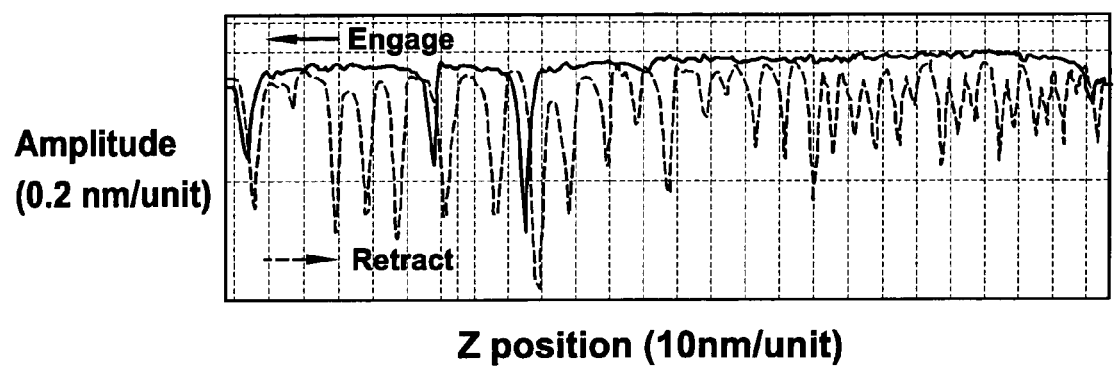
FIG. 5A is a force curve for a carbon nanotube, such as the nanotube shown in FIG. 4A, manufactured in connection with another example embodiment of the present invention.
Figure 5B:
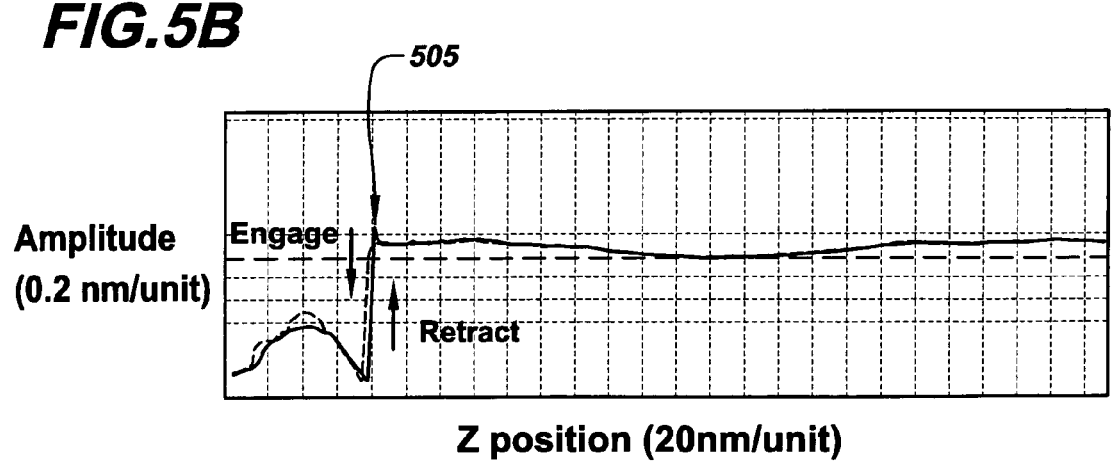
FIG. 5B is a force curve for a shortened carbon nanotube, such as the nanotube shown in FIG. 4B, according to another example embodiment of the present invention.

In another example embodiment of the present invention, FIGS. 5A and 5B show force curves of the nanotube cantilever 405 obtained during application as an AFM cantilever used to identify whether the nanotube has been sufficiently shortened. FIG. 5A shows the fluctuating cantilever vibration amplitude when the cantilever 405 nanotube is applied to a substrate, where the Z position on the horizontal axis represents the distance that the cantilever is from the surface of the substrate. The cantilever vibration amplitude fluctuation is used as a signature of buckling of a long and soft SWNT, and is thus used for assessing whether SWNTs are grown out of silicon tips without necessarily relying on SEM imaging. For instance, the absence of cantilever vibration amplitude fluctuation is indicative of the absence of a nanotube. The nanotube continues to vibrate in FIG. 5A as it is retracted further away from the substrate.

To shorten the tube, an electric bias voltage between the nanotube and a doped silicon substrate is increased until the nanotube is etched by oxygen discharge. This procedure is repeated until the force curve reaches a threshold that indicates that a rigid and non-sticking nanotube tip is obtained, with sharp cantilever vibration amplitude decrease upon engaging and little hysteresis in the engaging and retracting curves, as shown in FIG. 5B. Specifically, in connection with this example embodiment, it has been discovered that, after the nanotube is retracted from the substrate at point 505 on the curve, the amplitude of the vibration is significantly less than that shown in FIG. 5A (e.g., less than about 0.4 nm). In this regard, a threshold amplitude of the curve can be determined to correspond to the nanotube being sufficiently shortened, such that a rigid and non-sticking nanotube tip is obtained. The yield of the shortening process is about 70%, leading to abundant functional SWNT probe tips for AFM and/or other implementations.

As discussed herein, SWNTs on silicon pyramid tips may be implemented in a variety of applications. In one particular implementation, SWNT AFM tips are used to image proteins adsorbed onto carbon nanotubes grown from ferritin-based catalyst on $SiO_2$ substrates, such as Staphylococcus protein-A adsorbed onto the side of a SWNT. The nanotube tip is used to identify individual proteins spaced apart at a distance as small as or smaller than a few nanometers along the nanotube having the adsorbed protein. In addition, the imaging quality with the nanotube tips has been found to exhibit no appreciable degradation over extended periods of scanning.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include using other patterning techniques and growth conditions. For instance, the growth temperatures and gas flow rates can be varied, with the parameters being balanced to result in an active SWNT growth regime as described earlier. In addition, the nanotube shortening process may be automated, and other methodologies to shorten nanotubes at the wafer scale can be used. Furthermore, other implementations are directed to using nanotubes having materials other than carbon, such as boron or silicon, and/or exchanging SWNTs with MWNTs. Such modifications and changes do not depart from the true spirit and scope of the present invention.

What is claimed is:

1. A method for manufacturing a plurality of nanotube tips, the method comprising:
    forming a removable layer on a portion of a wafer having elevated structures extending therefrom, at least a portion of the elevated structures being substantially free of the removable layer;
    forming catalyst material on the removable layer and on the at least a portion of the elevated structures being substantially free of the removable layer;
    removing the removable layer and the catalyst material thereon, leaving catalyst material on a portion of the elevated structures; and
    growing single-walled carbon nanotube tips from the plurality of elevated structures using the catalyst material.

2. The method of claim 1, wherein forming catalyst material comprises:
    spin-coating a catalyst suspension on the wafer; and
    wherein removing the removable layer includes removing a portion of the catalyst suspension.

3. The method of claim 2, wherein forming a removable layer comprises:
    forming a photoresist layer on the wafer and leaving at least a portion of the elevated structures exposed;
    wherein spin-coating a catalyst suspension on the wafer includes spin-coating a catalyst suspension on the photoresist layer and on the exposed portion of the elevated structures; and
    wherein removing a portion of the catalyst suspension includes removing a portion of the photoresist layer having catalyst suspension thereon.

4. The method of claim 3, wherein forming a photoresist layer includes spin-coating the photoresist layer on a portion of the wafer that does not include an upper portion of the elevated structures.

5. The method of claim 2, wherein removing the removable layer and the catalyst material thereon includes lifting off the removable layer with a solvent.

6. The method of claim 5, wherein lifting off the removable layer with a solvent includes using acetone to dissolve a portion of the removable layer.

7. The method of claim 1, wherein forming catalyst material includes selectively placing a metal salt on the elevated structures and configured and arranged for growing at least one nanotube from each elevated structure.

8. The method of claim 1, wherein forming catalyst material includes selectively placing the catalyst material on sidewalls of the elevated structures that extend from the wafer.

9. The method of claim 1, wherein forming catalyst material includes selectively placing a thin layer of catalyst material around at least a portion of an elevated structure.

10. The method of claim 1, wherein growing single-walled carbon nanotube tips includes using a carbon-containing gas as feedstock and CVD growing the single-walled carbon nanotube tips.

11. The method of claim 10, wherein growing single-walled carbon nanotube tips includes using a hydrogen co-flow for the CVD growth.

12. The method of claim 11, wherein using a hydrogen co-flow includes using a hydrogen co-flow having flowrate characteristics selected to inhibit carbon pyrolysis while maintaining the growth of the single-walled carbon nanotube tips.

13. The method of claim 1, wherein forming catalyst material includes selectively placing catalyst material on at least 300 elevated structures and wherein growing single-walled carbon nanotube tips includes growing single-walled carbon nanotube tips from at least 85% of the at least 300 elevated structures.

14. The method of claim 1, further comprising shortening the length of at least one of the single-walled carbon nanotube tips.

15. The method of claim 14, wherein shortening the length of the at least one of the single-walled carbon nanotube tips includes applying an electric bias voltage between the single-walled carbon nanotube tip and a doped silicon substrate and oxygen discharge etching the single-walled carbon nanotube tip.

16. The method of claim 15, wherein forming a removable layer on a portion of a wafer having elevated structures extending therefrom includes forming a removable layer on a portion of a wafer having cantilevers, each cantilever having an elevated structure, further comprising applying the single-walled carbon nanotube tip against the substrate by oscillating the cantilever and obtaining a force curve for the single-walled carbon nanotube tip, wherein shortening the length of the at least one of the single-walled carbon nanotube tips includes shortening the length of the single-walled carbon nanotube tip until the force curve reaches an amplitude threshold that indicates that a rigid and non-sticking nanotube tip is obtained.

17. The method of claim 14, wherein shortening the length of the at least one of the single-walled carbon nanotube tips includes electrically discharging a portion of the at least one of the single-walled carbon nanotube tips.

18. The method of claim 1, further comprising:
removing one of the plurality of elevated structures having a single-walled carbon nanotube tip from the wafer; and
mounting the removed elevated structure onto a testing arrangement.

19. The method of claim 18, wherein mounting the removed elevated structure onto a testing arrangement includes mounting the removed elevated structure onto an atomic force microscopy arrangement.

20. The method of claim 1, wherein forming catalyst material comprises evaporating a sub-nanometer thick iron film onto the elevated structures, where the iron film is adapted to catalyze the growth of carbon nanotubes from the elevated structure.

21. The method of claim 1, wherein forming catalyst material comprises patterning the catalyst during the manufacture of the wafer.

22. The method of claim 1, wherein growing single-walled carbon nanotube tips includes growing nanotubes that include carbon and another type of atom.

23. The method of claim 1, wherein growing single-walled carbon nanotube tips includes growing probe tips for atomic force microscopy.

24. A method for manufacturing a plurality of probe tips, the method comprising:
spin-coating a photoresist onto a wafer having a plurality of elevated structures and leaving at least a portion of the elevated structures exposed and substantially free from photoresist;
forming catalyst suspension material on a portion of the photoresist and the exposed elevated structures;
after forming the catalyst suspension material, removing the photoresist and a portion of the catalyst suspension material thereon with a solvent, leaving catalyst material on sidewalls of the plurality of elevated structures;
placing the wafer into a CVD chamber; and
heating the CVD chamber and growing single-walled carbon nanotube probe tips extending from the catalyst suspension material on the plurality of elevated structures.

* * * * *

UNITED STATES PATENT AND TRADEMARK OFFICE
CERTIFICATE OF CORRECTION

PATENT NO. : 7,022,541 B1  Page 1 of 1
APPLICATION NO. : 10/299978
DATED : April 4, 2006
INVENTOR(S) : Yenilmez et al.

It is certified that error appears in the above-identified patent and that said Letters Patent is hereby corrected as shown below:

Col. 5, line 54: "1500 seem" should read --1500 sccm--.

Col. 5, line 57: "1500 seem" should read --1500 sccm--.

Signed and Sealed this

Twenty-fourth Day of April, 2007

JON W. DUDAS
*Director of the United States Patent and Trademark Office*